United States Patent Office 2,997,374
Patented Aug. 22, 1961

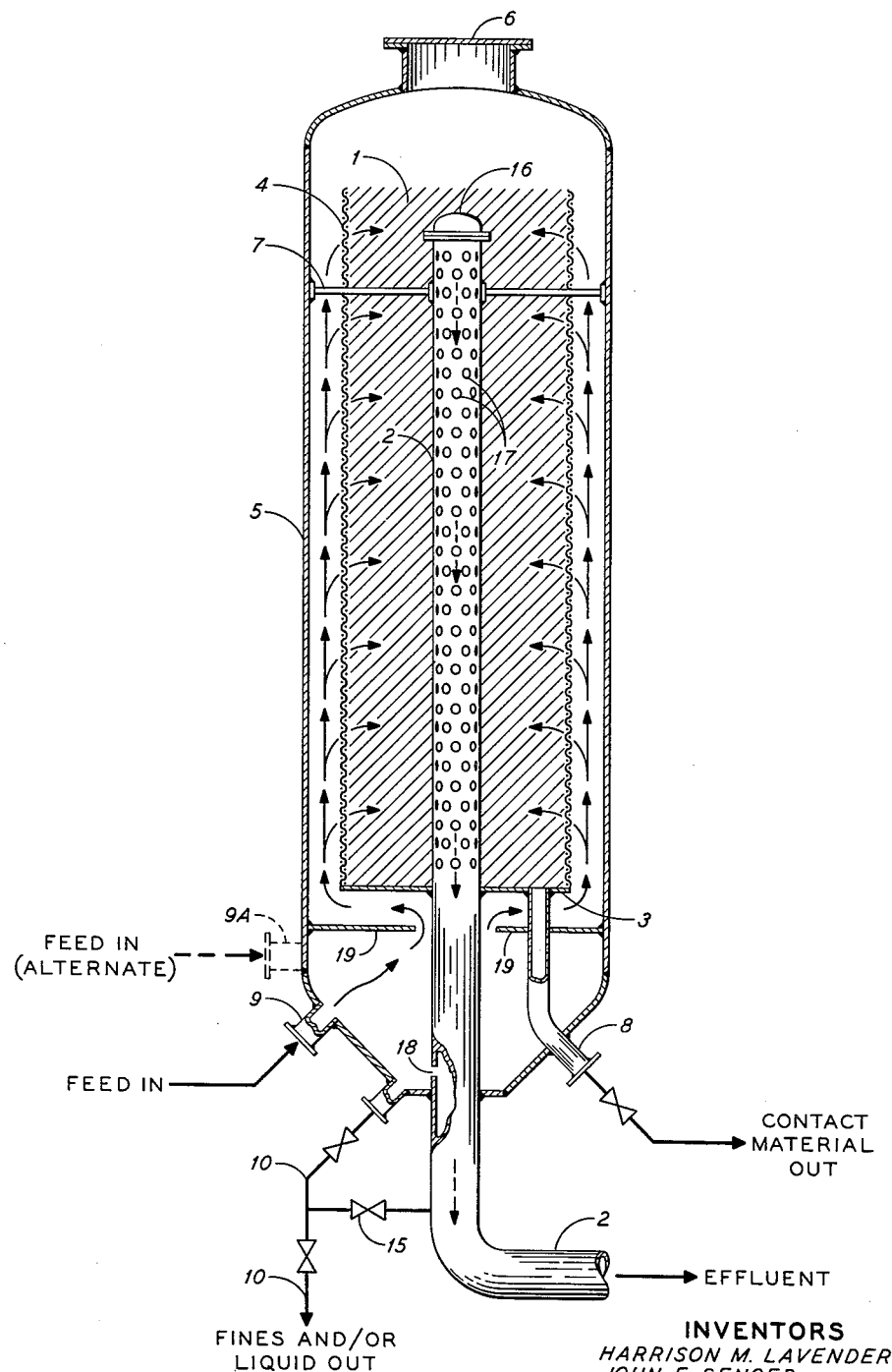

2,997,374
RADIAL FLOW REACTOR
Harrison M. Lavender, Jr., San Anselmo, and John F. Senger, Berkeley, Calif., assignors to California Research Corporation, San Francisco, Calif., a corporation of Delaware
Filed Mar. 13, 1958, Ser. No. 721,300
2 Claims. (Cl. 23—288)

This invention relates to radial flow reactors, and more particularly to radial flow reactors adapted to hold a fixed bed of subdivided contacting material, for example, catalyst, in a manner permitting radial flow of a reactant stream therethrough.

Conventional fixed bed radial flow reactors, for example, radial flow reactors used in catalytic reforming processes, generally embody a fixed bed of subdivided contact material longitudinally traversed by a perforated conduit and surrounded by a retaining screen material having a scalloped appearance when viewed in transverse section. The scalloped retaining screen is surrounded by the reactor housing and the spaces between the scallops and the inner wall of the reactor housing serve as longitudinal fluid flow paths. In such conventional reactors, the inlet for the fluid reactant stream is generally located at one end of the reactor housing and a reaction product outlet is generally located at the other end of the reactor housing. The inlet is commonly located at the top of the reactor housing and a cover plate or baffle is situated on top of the catalyst bed beneath the reactant stream inlet to divert the incoming reactant stream into the longitudinal fluid flow paths between the scallops and the wall of the reactor, from where the stream passes transversely through the catalyst bed, the resulting reaction product stream from the bed passing into the perforated conduit longitudinally traversing the bed. The longitudinal fluid flow paths between the scallops and the reactor housing must be blocked at the ends thereof that are farthest from the reactant stream inlet and this is commonly accomplished by seating the fixed bed of subdivided material on a mass of ceramic balls located in the bottom of the reactor housing.

The foregoing conventional practice is subject to numerous disadvantages. One important disadvantage is that fines, for example, rust, scale from furnace tubes, etc., carried into the reactor housing with the reactant stream, tend to collect in the bottom of the vertical fluid passageways between the scallops and the reactor housing and also tend to pass into the reactor bed through the retaining screen. This causes various problems, including excessive pressure drop in different portions of the reactor, irregular fluid flow, and the development of hot spots in the reactor bed because of fines accumulation therein. Catalyst leaks from preceding reactors can fill the scallops causing even more serious hot spots against the reactor shell.

Another serious disadvantage of conventional radial flow reactors is the problem associated with the necessity for a cover plate or baffle to divert the incoming reactant stream around the end of the catalyst bed. This cover plate must be carefully and accurately fitted to the retaining screen and in some cases to the perforated conduit, in order to prevent blow-by because of the pressure differential on each side of the cover plate. Further, the cover plate or baffle must be removed at periodic intervals from a relatively small opening in the housing in order to change the catalyst. Various expedients have been used to permit such removal, including the provision of collapsible baffles; however, these expedients generally leave much to be desired. Further, it frequently is desired to withdraw a sample of the subdivided contacting material from the reactor housing by means of a conventional sampling "thief," which, however, cannot be inserted into the bed of subdivided material through the cover plate when the cover plate is in place. The difficulty in removing the cover plate for this purpose and in refitting it is obvious. Samples of the subdivided material could be withdrawn through a valve, for example, located near the bottom of the reactor housing; however, the main difficulty in this situation is that, particularly under operating conditions, it may not be possble to reclose the valve.

It is an object of the present invention to provide methods and apparatus which will avoid the difficulties associated with a build-up of fines in a fixed bed radial flow reactor. It is a further object of the present invention to provide methods and apparatus which will avoid the difficulties associated with the placing and removal of a catalyst cover plate or baffle in a fixed bed radial flow reactor.

In accordance with the present invention, simple, effective and efficient methods and apparatus are provided for effecting contact between a reactant stream and a subdivided solid contact material, by passing said reactant stream upwardly around the bottom of a vertically elongated mass of said material, and thence transversely from the outer sides of said material to a vertical channel located inside said material, and withdrawing reaction products downwardly through said mass through said vertical channel.

The novel features of the present invention are set forth with particularity in the appended claims. The invention will best be understood, however, both as to organization and operation, and additional objects and advantages thereof will be apparent, from the following description of a specific embodiment, when read in conjunction with the accompanying drawing, in which the single figure there shown is a partial sectional view of a reactor constructed in accordance with the present invention.

Referring now to the drawing, a fixed bed 1 of subdivided contacting material longitudinally traversed by a perforated center pipe conduit 2 is supported on a bed plate 3. The sides of the bed of contacting material is supported and retained by screening material 4 having a scalloped appearance when viewed in transverse section. Contacting material bed 1 and screening material 4 are surrounded by reactor housing 5 provided with an access manway cover plate 6. Rods 7 may be provided for support of the upper portion of center pipe 2. A conduit 8 may be provided for withdrawing subdivided contacting material from bed 1. An inlet 9 is provided in reactor housing 5 for entry of the feed into the reactor. Alternate conduit 9A may be provided in the side of reactor housing 5 if desired and the operation of the reactor with the inlet conduit in this alternate position will be as described hereinafter. Conduits 10 and 15 may be provided for removing fines from the reactor housing as described hereinafter. Center pipe conduit 2 preferably is provided with closure means 16.

Center pipe conduit 2 is liberally perforated with a multiplicity of holes 17 throughout the length thereof from closure 16 to bed plate 3 in order that the reactant stream may be passed relatively uniformly through bed 1 into all portions of center pipe 2 that are located within contacting material bed 1. Holes 17 may be made small enough to prevent passage of particulate contact material therethrough; however, in most cases it will be preferable to provide larger holes and cover them with screening material to prevent passage of particulate contact material through the holes. The portion of center pipe 2 lying within the reactor housing 5 below bed plate 3 is substantially unperforated except that one or a few perforations 18 may be provided for the purpose hereinafter indicated. Baffle plates 19 may be provided for a purpose which will be indicated hereinafter.

In the operation of the embodiment illustrated in the drawing, for example in a reforming process, a reactant stream is passed into the lower end of reactor housing 5 through inlet 9. This reactant stream may carry particles of rust, scale from furnace tubes and other fines. Suitable baffles 19 may be provided for deflecting incoming fines down to the bottom of reactor housing 5. One or a few holes 18 may be provided in center pipe 2 in the otherwise imperforate portion thereof between bed plate 3 and the bottom of reactor housing 5. Because the pressure in center pipe 2 is lower than the pressure in the neighborhood of baffles 19, a small portion of the reactant stream entering reactor housing 5 through line 9 will be aspirated through hole or holes 18 by a fluid flowing downwardly through center pipe 2. This small portion of the reactant stream will tend to carry into center pipe 2 through holes 18, fines that accumulate in the bottom of reactor housing 5. If desired, valved line 10 may be provided as an alternate means of fines removal. Valved branch line 15 may be provided if it is desired to have the fines removed through line 10 pass into the effluent line from center pipe 2. The main body of the reactant stream entering reactor housing 5 through inlet 9 is passed upwardly through the vertical fluid flow paths formed by the scalloped edges of retaining screen 4 and the walls of reactor 5. This main portion of the reactant stream passing into the vertical fluid flow paths contains a substantially lesser concentration of fines than is contained in the entire reactant stream entering reactor housing 5. As the stream passes up the vertical fluid flow paths, additional fines will separate out and drop to the bottom of reactor housing 5, thus still further reducing the fines concentration in the stream. From the vertical fluid flow paths the reactant stream is passed radially inward and essentially in a horizontal direction through substantially the entire height of the catlyst bed 1. The liberally perforated portion of center pipe 2 that is located within catlyst bed 1 may be perforated in a graduated manner, i.e., with a progressively changing total area of perforations along the center pipe, in order to provide any desired pressure gradients through various portions of the catalyst bed. Reaction products entering center pipe 2 from catalyst bed 1 through perforations 17 are withdrawn from reactor housing 5 downwardly through center pipe 2.

Alternatively, reactant stream inlet 9 may be located in the wall of reactor housing 5 at the lower end thereof in the position shown as 9A. In such case, inlet 9A will be so positioned in reactor housing 5 that the reactant stream entering through inlet 9A is directed tangentially against the interior wall of reactor housing 5. Baffles 19 and the lower portion of reactor housing 5 will in effect act as a built-in cyclone for disengaging fines from the reactant stream entering housing 5 tangentially through inlet 9A. Thus, advantage may be taken of centrifugal force effects which will tend to detrain fines from the incoming reactant stream and cause them more readily to fall to the bottom of reactor housing 5.

From the foregoing it may be seen that by the methods and apparatus of the present invention, fines are prevented from collecting in vertical fluid passageways and other portions of a reactor and are removed in large part by detraining them from the inlet reactant stream, subsequent removal from the reactant housing being accomplished by aspirating them into the effluent stream from the reactor, or by other means. Thus, pressure drops, irregular fluid flow and hot spots in the reactor bed which would be caused by an accumulation of fines are prevented. It may also be seen that the present invention provides for efficient radial flow reactor operation without the necessity for the use of a catalyst bed cover plate to deflect the incoming reactant stream. Problems of cover plate fitting are thus eliminated, and the insertion of a sampling "thief" into the catalyst bed through the top of the reactor, without the necessity for removing a catalyst cover plate, is made possible.

The methods and apparatus of the present invention may be used to particular advantage in catalytic hydrocarbon conversion operations such as dehydrogenation, reforming, hydroforming, hydrocracking, hydrogenation, etc.

The methods and apparatus of the present invention will be ideally suited to the use of a gaseous feed, from which fines may be efficiently detrained prior to contact between the gas and the bed of contacting material. However, the methods and apparatus of the invention also are applicable to a mixed phase feed comprising gases and liquids. In such case liquids condensing and collecting at the bottom of reactor housing 5 under the prevailing operating conditions may be removed through one or a few perforations 18, or through line 10, in the same manner as has been discussed for the removal of fines. Also, in such case it will be apparent that with a number of reactors in series, the feed entering each succeeding reactor generally will tend to contain less and less liquid.

Although only specific arrangements and modes of construction and operation of the present invention have been described and illustrated, numerous changes could be made in those arrangements and modes without departing from the spirit of the invention. All such changes that fall within the scope of the appended claims are intended to be embraced thereby.

What is claimed is:

1. Reactor apparatus for effecting contact between a reactant stream and subdivided solid contact material, which comprises in combination, an elongated outer housing containing an inlet chamber and a reaction chamber, said inlet chamber being adjacent a first end of said housing; inlet means within said inlet chamber for the reactant stream; elongated fluid conduit means disposed longitudinally in said housing from said first end of said housing and through said inlet chamber to a point in said reaction chamber near the second end of said housing, the end of said conduit means at said first end of said housing being open to the exterior of said housing and forming an outlet for reaction products and the other end of said conduit means being closed, said conduit means within said reaction chamber being liberally perforated for a substantial portion of its length; particle-retaining screening within said reaction chamber disposed adjacent to and spaced apart from the inner walls of said housing and at least coextensive with the length of the liberally perforated conduit portion to form with said inner walls a substantially unobstructed longitudinal fluid flow path adjacent to said inner walls; means for supporting a mass of subdivided solid contact material in the space between said fluid conduit means and said screening; baffle means extending across said housing from said inner walls to a point adjacent said conduit means, said baffle separating said inlet chamber from said reaction chamber, and a perforation in the portion of said conduit means within said inlet chamber adjacent the point at which said conduit means is open to the exterior of said housing.

2. The apparatus of claim 1 wherein the end of said particle-retaining screening remote from said inlet chamber is spaced apart from said second end of said housing.

References Cited in the file of this patent

UNITED STATES PATENTS

| 2,093,090 | Manning | Sept. 14, 1937 |
| 2,187,741 | Houdry | Jan. 23, 1940 |
| 2,271,646 | Kassel | Feb. 3, 1942 |
| 2,357,531 | Mather | Sept. 5, 1944 |
| 2,626,675 | Maher | Jan. 27, 1953 |